(12) United States Patent
Conn et al.

(10) Patent No.: US 11,105,957 B2
(45) Date of Patent: Aug. 31, 2021

(54) VIRTUAL SENSING FOR ADJOINT BASED INCORPORATION OF SUPPLEMENTARY DATA SOURCES

(71) Applicants: International Business Machines Corporation, Armonk, NY (US); SHELL OIL COMPANY, Houston, TX (US)

(72) Inventors: Andrew R. Conn, Mount Vernon, NY (US); Sippe Douma, Sultanate of Oman (NL); Gijs Van Essen, Sultanate of Oman (NL); Lior Horesh, North Salem, NY (US); Eduardo Antonio Arismendi Jimenez, Houston, TX (US); Ulisses Mello, Blauvelt, NY (US)

(73) Assignees: International Business Machines Corporation, Armonk, NY (US); Shell Oil Company, Houston, TX (US)

( * ) Notice: Subject to any disclaimer, the term of this patent is extended or adjusted under 35 U.S.C. 154(b) by 0 days.

(21) Appl. No.: 16/795,939

(22) Filed: Feb. 20, 2020

(65) Prior Publication Data
US 2020/0191996 A1 Jun. 18, 2020

Related U.S. Application Data

(63) Continuation of application No. 14/460,986, filed on Aug. 15, 2014, now Pat. No. 10,578,768.

(51) Int. Cl.
*G01V 99/00* (2009.01)
*G01V 1/30* (2006.01)
(Continued)

(52) U.S. Cl.
CPC ......... *G01V 99/005* (2013.01); *E21B 43/16* (2013.01); *G01V 1/306* (2013.01); *G01V 11/00* (2013.01); *G01V 2210/66* (2013.01)

(58) Field of Classification Search
CPC ...... G01V 99/005; G01V 1/306; G01V 11/00; G01V 2210/66
(Continued)

(56) References Cited

U.S. PATENT DOCUMENTS

2010/0198570 A1  8/2010  Sarma et al.
2011/0295510 A1  12/2011  Gulati
(Continued)

OTHER PUBLICATIONS

Maity, Debotyam, and Fred Aminzadeh. "Reservoir characterization of an unconventional reservoir by integrating microseismic, seismic, and well log data." SPE western regional meeting. Society of Petroleum Engineers, 2012. pp. 1-14. (Year: 2012).*
(Continued)

*Primary Examiner* — Kamini S Shah
*Assistant Examiner* — John E Johansen
(74) *Attorney, Agent, or Firm* — Scully, Scott, Murphy & Presser, P.C.; Daniel P. Morris (57) ABSTRACT

A method, system and computer program product are disclosed for integrating plural modalities of information to obtain values for a specified attribute of a given system. In one embodiment, the method comprises acquiring data of a first modality, conveying a first source of data of a first type of the system; configuring simulator with settings of physical sensors; acquiring data of a second modality from the system, conveying a second source of data of a second type of the system. The method further comprises converting the data of the second modality to data of the first type, while configuring a virtual set of sensors to enable acquisition of the converted data of the second modality; and configuring adjoints equipped simulator with settings of the virtual sensors, to mimic collection of data of the first type, while configured to measure data of second type.

14 Claims, 4 Drawing Sheets

(51) Int. Cl.
*E21B 43/16* (2006.01)
*G01V 11/00* (2006.01)

(58) Field of Classification Search
USPC .................................................. 703/2, 10
See application file for complete search history.

(56) References Cited

U.S. PATENT DOCUMENTS

| | | | |
|---|---|---|---|
| 2011/0308811 A1 | 12/2011 | Ghayour et al. | |
| 2011/0313958 A1* | 12/2011 | Roverso ............... | G01W 1/00 706/12 |
| 2012/0150506 A1 | 6/2012 | Han et al. | |
| 2012/0232865 A1 | 9/2012 | Maucec et al. | |
| 2013/0258810 A1 | 10/2013 | Hu | |
| 2013/0268527 A1 | 10/2013 | Block | |
| 2013/0343156 A1 | 12/2013 | Horne | |
| 2014/0257780 A1 | 9/2014 | Jing et al. | |
| 2016/0274256 A1 | 9/2016 | Coates et al. | |
| 2016/0334270 A1 | 11/2016 | Van Manen et al. | |

OTHER PUBLICATIONS

Watanabe, Shingo, et al. "Streamline-based time lapse seismic data integration incorporating pressure and saturation effects." SPE Annual Technical Conference and Exhibition. Society of Petroleum Engineers, 2013. pp. 1-29. (Year: 2013).*

Watababe et al., "Streamline-Based Time Lapse Seismic Data Integration Incorporating Pressure and Saturation Effects", SPE Annual Technical Conference and Exhibition, New Orleans, LA, USA, Sep. 30-Oct. 2, 2013, Society of Petroleum Engineers, 2013, pp. 1-29.

Van Doren, et al., "Parameter identification in large-scale models for oil and gas production," 18th IFAC World congress, Milano Italy, Aug. 28-Sep. 2, 2011, pp. 10857-10862.

Van Den Hof, et al., "Recent developments in model-based optimization and control of subsurface flow in oil reservoirs," Proceedings of the 2012 IFAC Workshop on Automatic Control in Offshore Oil and Gas Production, Norwegian University of Science and Technology, Trondheim, Norway, May 31-Jun. 1, 2012, pp. 189-200.

Haber et al., "Numerical methods for the design of large-scale nonlinear discrete ill-posed inverse problems", Inverse Problems, vol. 26, No. 2, (2010), published Dec. 18, 2009, pp. 1-14.

Horesh et al., "Optimal Experimental Design for the Large-Scale Nonlinear Ill-posed Problem of Impedance Imaging", Wiley Book Series on Computational Methods for Large-Scale Inverse Problems and Quantification of Uncertainty, 2012.

Oliver et al., "Inverse Theory for Petroleum Reservoir Characterization and History Matching", 377 p., ISBN 978-0-521-88151-7, BOOK, Cambridge University Press, copyright D.S. Oliver, A.C. Reynolds, N. Liu 2008.

Van Doren et al., "Structural Identifiability of Grid Block and Geological Parameters in Reservoir Simulation Models", ECMOR XI B15, 11th European Conference on the Mathematics of Oil Recovery—Bergen, Norway, Sep. 8-11, 2008.

Sarma et al., "Implementation of Adjoint Solution for Optimal Control of Smart Wells", SPE Paper 92864, presented at the SPE Reservoir Simulation Symposium, Houston, TX, 2005, Jan. 31, 2005-Feb. 2, 2-5, pp. 1-17.

Bryson, Jr, et al., "Applied Optimal Control: Optimization, Estimation, and Control", Taylor & Francis Group, LLC, gew York, NY 1975. ISBN 10: 0-89116-228-3.

Shengtai, Li et al. "Adjoint sensitivity analysis for time=dependent partial differential equations with adaptive mesh refinement" Journal of Computational Physics, 198 (2004) pp. 310-325.

Kahrobaei, S. et al. "Adjoint-Based History Matching of Structural Models Using Production and Time-Lapse Seismic Data" SPE International, SPE Reservoir Simulation Symposium, Feb. 2013.

Sarma, P. et al. "Efficient Real-time Reservoir Management Using Adjoint -based Optimal Control and Model Updating" Computational Geosciences, Mar. 2006, vol. 10, Issue 1, pp. 3-36 Mar. 23, 2006.

List of IBM Patents or Patent Applications Treated as Related.

* cited by examiner

VIRTUAL SENSING FOR ADJOINT BASED INCORPORATION OF SUPPLEMENTARY DATA SOURCES

CROSS REFERENCE TO RELATED APPLICATION

This application is a continuation of copending U.S. patent application Ser. No. 14/460,986, filed Aug. 15, 2014, the entire contents and disclosure of which are hereby incorporated herein by reference.

BACKGROUND

This invention generally relates to integration of plural sources of information in inversion, and more specifically, to incorporation of plural sources of data of different modalities in inversion. An embodiment of the invention relates to combining such plural sources of data using adjoint based optimization methods.

In many situations, it is essential to be able to predict how the state and the attributes of a system vary over time. For example, prediction of flow of fluids through a reservoir for certain scenarios, e.g. well placement, production optimization, etc., is desirable for supporting business/investment decisions. For efficient recovery of oil and gas from a reservoir, a good understanding of the subsurface attributes and its constitutes is vital.

Conventionally, production data comprised of measurements of pressures in the wells, along with fluid (oil and water) and gas flow rates, is used in attempt to recover the subsurface attributes. The process in which this is performed is called history matching. In this process, the model parameters (such as permeability, porosity, skin, seal factors) are being adjusted so that simulation of flow would match the recorded production data at the wells. There are several strategies for updating the model parameters, including manual trial and error. The most widely accepted approach is based upon non-linear optimization. In this approach, the problem is cast as minimization of an objective function that comprises a measure of the misfit (likelihood) between the actual measured data and the one that is simulated based upon a choice of model parameters. e.g.:

$$\hat{m} = \arg\min_{m} \underbrace{\mathcal{D}(V(u(m;y)), d(y))}_{\text{data misfit}}$$

$$\text{s.t.} \quad g(m, u; y) = 0$$

constraints where m denotes the model parameters, D stands for a noise/distance model, V is a function that converts the state u (saturation and pressure for flow in porous medium) into simulated measurement, y denotes the experimental design setup and d denotes the real data. As a constraint, the state u must comply with the governing physics of the problem (e.g. flow in porous medium represented by a set of partial differential equations along with appropriate boundary conditions) as represented by the operator g. This objective function may involve additional terms, such as regularization, or additional constraints (e.g. positivity or bounds for some parameters).

Among the various computational methods to solve this optimization problem, adjoint (sensitivity) based methods are acknowledged in the optimization community as superior, and for large-scale problems, often these approaches are the only computationally tractable resort.

Unfortunately, the acquired production data do not convey sufficient information for a complete and stable recovery of the subsurface attributes.

BRIEF SUMMARY

Embodiments of the invention provide a method, system and computer program product for integrating plural modalities of information, in an inversion process using a defined set of modeling parameters, to obtain values for a specified attribute of a given system. In one embodiment, the method comprises acquiring data of a first modality from a set of physical sensors, conveying a first source of data of a first type of the system; configuring adjoints equipped simulator with settings of physical sensors; acquiring data of a second modality from the system, conveying a second source of data of a second type of the system; and converting the data of the second modality to data of the first type, while configuring a virtual set of sensors to enable acquisition of the converted data of the second modality. The method further comprises configuring adjoints equipped simulator with settings of the virtual sensors, to mimic collection of data of the first type, while configured to measure data of second type; computing sensitivities for physical and virtual sensors using the existing adjoint functionality of the simulator; and combining the data of the first modality and the converted data of the second modality together with the sensitivities of the physical and virtual sensors, in an inversion process, to obtain values for a specified attribute of the given system.

In an embodiment, the data of the first modality and the converted data of the second modality are assimilated in the inversion process in a spatially and temporally consistent manner.

In one embodiment, the physical sensors have a defined configuration and are used in a defined timing schedule to obtain the first data; and the converting the data of the second modality includes converting the data of the second modality to the data of the same type as of the first type of data, as measured by the virtual sensors in said specified configuration and in accordance with said defined timing schedule to maintain spatial and temporal consistency between the first data and the converted second data.

In one embodiment, the inversion process applies respective weights between the contributions of the physical sensors and the virtual sensors to achieve a specified objective.

In an embodiment, the respective weights are determined by a specified measure of confidence associated with each of the sources of data.

In an embodiment, the data of the second type includes physical measurements, and the virtual measurements mimic the physical measurements through the use of a weighted virtual measurement.

In one embodiment, the virtual measurements are spatially and temporally consistent with the origin of the information, and the virtual measurements mimic the physical measurements through the use of a weighted virtual measurement along the path of the trace.

In an embodiment, the system is a reservoir including oil and water.

In one embodiment, the acquiring data of a first modality includes obtaining physical measurements along a plurality of wells in the reservoir; the acquiring data of a second modality includes obtaining saturation measurements of a plurality of seismic traces along a plurality of virtual wells in the reservoir; and the virtual wells mimic the saturation measurement of the seismic traces through the use of a weighted virtual measurement along the paths of the traces.

In an embodiment, a virtual sensor comprises of a multitude of grid blocks, and each of said grid blocks have a grid block flow rate; and in order to match a ratio of volumetric samples from all grid blocks along the path of the virtual sensor to corresponding weight factors, the grid block flow rates correspond to said ratio.

The most advanced simulators offer efficient adjoint-based sensitivity computation of the model parameters with respect to a single source of data (e.g. reservoir simulator would offer sensitivities that link between a small change in the subsurface parameters and a respective change in the well data expected). In embodiments of the invention, in order to obtain sensitivities with respect to an additional modality (e.g. seismic), interpreted entities (e.g. interpreted saturation for seismic) are integrated through the use of a weighted virtual measurement that consistently retains the locality of the information of additional modalities (e.g. for seismic attributes) along the path of the trace.

The virtual sensor mimics a conventional sensor (e.g. production well), and therefore, the present adjoint computation capability of a simulator can be leveraged and extended towards other types and sources of data. In embodiments of the invention, in order to minimize interference of virtual sensing upon the original dynamic behavior of the system under consideration (e.g. influence upon flow and fluid contents in the context of flow in porous medium), precautions are taken (e.g. limit virtual samples quality, etc).

Information is assimilated in a spatially and temporally consistent manner. The original information (saturation information in the seismic case) is of a given dimension (e.g. a curve in 3 dimensional space), and respectively the virtual sensors are positioned along the same trajectory, thereby avoiding both displacement and interpolation errors. Also, since the virtual sensors are only activated with accordance to the timing in which the original information was attained, the temporal assimilation is free of interpolation.

DETAILED DESCRIPTION

Figure 1:
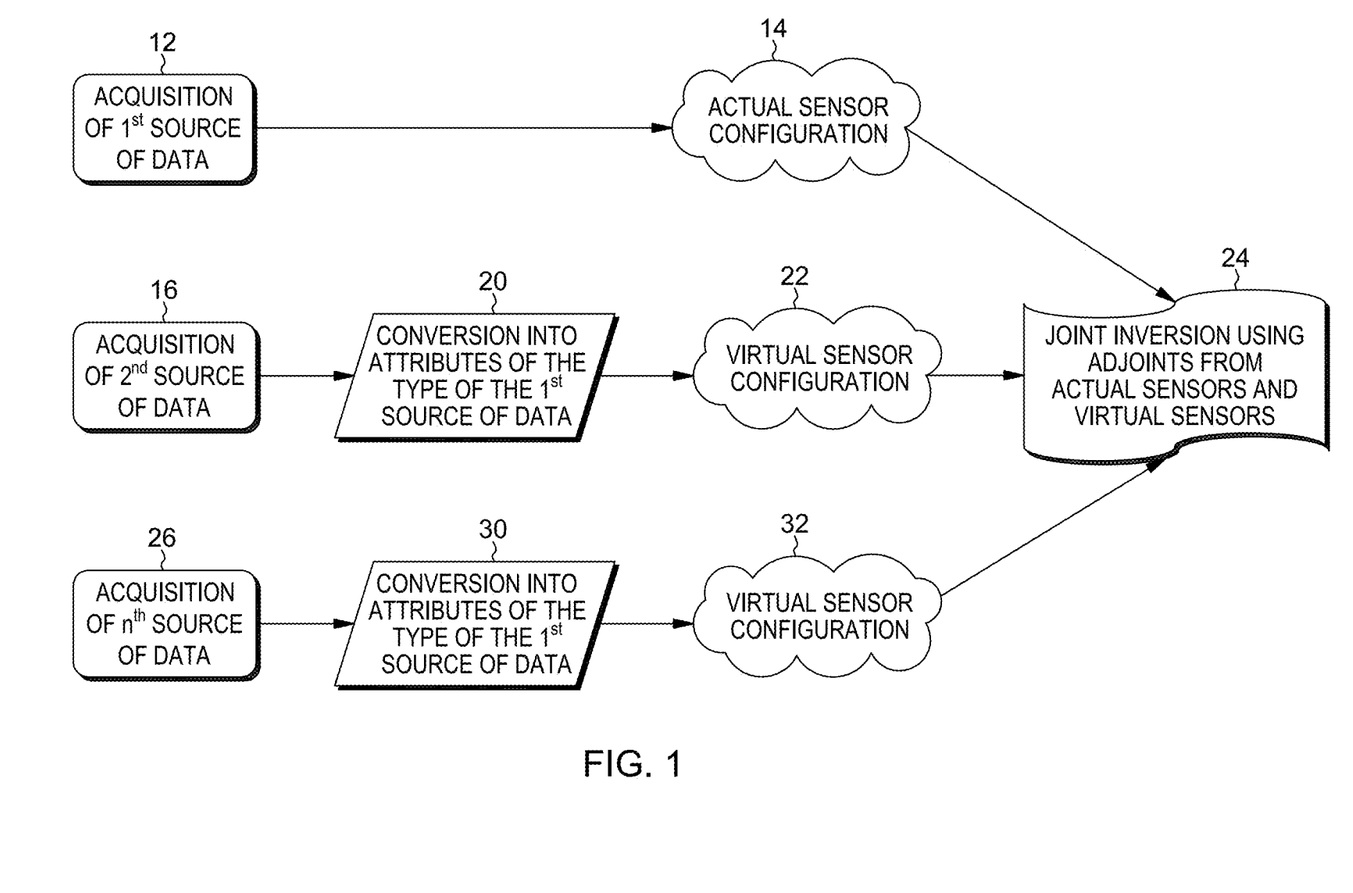
FIG. 1 depicts an embodiment of the invention.

This invention relates to integration of plural sources of data of different modalities in an inversion process to obtain values for one or more specified parameters of a given system. With reference to FIG. 1, in one embodiment, the invention provides a method comprising acquiring, at 12, data of a first modality from a set of physical sensors 14, conveying a first source of data of a first type of the system; configuring adjoints equipped simulator with settings of physical sensors; acquiring, at 16, data of a second modality from the system, conveying a second source of data of a second type of the system; and converting 20 the data of the second modality to data of the first type, while configuring a virtual set of sensors 22 to enable acquisition of the converted data of the second modality. The method further comprises configuring adjoints equipped simulator with settings of the virtual sensors, to mimic collection of data of the first type, while configured to measure data of second type; computing sensitivities for physical and virtual sensors using the existing adjoint functionality of the simulator; and combining the data of the first modality and the converted data of the second modality together with the sensitivities of the physical and virtual sensors, in an inversion process 24, to obtain values for a specified attribute of the given system.

In embodiments of the invention, data of plural or multiple modalities may be acquired 26 from plural or multiple sources, with each type of data converted 30 into attributes of data of the type of the first source of data, while configuring an associated virtual set of sensors 32, and combining this converted data also in the inversion process 24.

Generally speaking, an inverse problem is a problem in which model parameters are derived from known data. Inverse problems are generally difficult to solve for a variety of reasons and are considerably harder for process-based approaches in sedimentary systems because of the scarcity of field data needed to constrain the process.

The term "adjoint model" refers to a mathematical evaluation of the sensitivity of a predictive model such as a process-based model. Moreover, an adjoint model provides sensitivity relations that represent the extent to which the output of a predictive model varies as its input varies. An adjoint model may comprise of computation of the gradient or sensitivity of the acceptance criteria with respect to model parameters by solving an auxiliary set of equations, known as adjoint equations. The adjoint model is an efficient method for computing sensitivities of large-scale conditioning tasks and, unlike most methods, the computational cost does not scale with the number of conditioning parameters. Many types of adjoint models are known.

This invention may be used in a wide range of specific circumstances. As one example, embodiments of the invention may be used in the prediction of the flow of fluids through a reservoir. As mentioned above, prediction of flow of fluids through a reservoir for certain scenarios, e.g. well placement, production optimization, etc., is desirable for supporting business/investment decisions. For efficient recovery of oil and gas from a reservoir, a good understanding of the subsurface attributes and its constitutes is vital.

Conventionally, production data comprised of measurements of pressures in the wells, along with liquid (oil and water) and gas flow rates, is used in attempt to recover the subsurface attributes. The process in which this is performed is called history matching. In this process, the model parameters (such as permeability, porosity, skin, seal factors) are being altered so that simulation of flow would match the recorded production data at the wells. There are several strategies for updating the model parameters, including manual trial and error. The most widely accepted approach is based upon non-linear optimization. In this approach, the problem is cast as minimization of an objective function that comprises a measure of the misfit (likelihood) between the actual measured data and the data that are simulated for a choice of model parameters. e.g.:

$$\hat{m} = \arg \min_{m} \underbrace{\mathcal{D}(V(u(m; y)), d(y))}_{\text{data misfit}}$$

$$\text{s.t. } g(m, u; y) = 0$$

constraints where m denotes the model parameters, D stands for a noise/distance model, V is a function that converts the state u (saturation and pressure for flow in porous medium) into simulated measurement, y denotes the experimental design setup and d denotes the real data. As a constraint, the state u must comply with the governing physics of the problem (e.g. flow in porous medium represented through a set of partial differential equations along with appropriate boundary conditions) as represented by the operator g. This objective may involve additional terms, such as regularization, or additional constraints (e.g. positivity or bounds for some parameters).

Among the various computational methods to solve this optimization problem, adjoint (sensitivity) based methods are acknowledged in the optimization community as superior and for large-scale problems, often these approaches are the only computationally tractable resort.

Unfortunately, the acquired production data do not convey sufficient information for a complete and stable recovery of the subsurface attributes. Consequently, the resulted solutions are corrupted by intrusively large null space of the solution space. An intuition for that concern, is that the sensitivity of the acquired data at the sensor locations (e.g. wells) towards changes in the model parameters away from the sensors is negligibly small. In mathematical terms, the aforementioned limitation is formally referred to as ill-posedness nature of the history-matching problem.

One of the most effective remedies for ill-posedness is through supplementation of complementary information from additional modality(ies), i.e. from different sources. For instance, in contrast to production data, seismic data for instance, in which sound waves are used to estimate the characteristics of the main geological features of the reservoir, provide excellent spatial information regarding the subsurface, yet, this data suffers from very poor temporal resolution. Incorporation of areal data may supplement the poor spatial resolution of production data and diminish ill-posedness.

Incorporation of multi-modality data (e.g. production and seismic/electromagnetic/gravity/well bore holes measurements) in the process of inversion is intricate and delicate. Issues such as the relative weight of the information from each source, coupling of parameters of various physical entities, alignment of the grids, and efficient derivation of sensitivities, have all introduced great hurdles along the way. Handling the above consistently and without requiring major re-coding effort was hitherto not possible. In particular, the ability to derive efficiently adjoints (sensitivities) of the data with respect to the model parameters is key for updating model parameters using gradient-based optimization techniques. The functionality allows to assess the value of information and assist in decisions such as when should additional survey be performed? What should be the spatial resolution of such survey? What should be the granularity of the data? etc.

Several methods have been proposed in attempt to combine additional sources of data in dynamic history matching:

With Streamline, only sensitivities with respect to permeability can be determined efficiently. Derivation of streamlines sensitivities with respect to additional modalities is often not possible, or at least requires a major reformulation and coding effort. Also, as a reduced physics approach, it involves intrinsic modeling errors and is limited to specific approximation assumptions.

With Ensemble Kalman Filter methods, updates are restricted to the space spanned by the ensemble members. In addition, updates of model parameters may be insensitive to observations, and the number of required simulations is generally large.

With Petrophysics based, Coupling relies on empirical links, and derivation of adjoints are far from trivial.

Additional common drawback to all the above methods is the need of interpolation of the additional modalities (e.g. seismic attributes) onto the reservoir grid. Such interpolation incurs additional errors creeping into the solution.

Modern advanced reservoir simulators offer efficient adjoint-based sensitivity computation of the model parameters with respect to well data. In embodiments of the invention, in order to obtain sensitivities with respect to an additional modality (e.g. seismic), interpreted entities (e.g. interpreted saturation for seismic) are integrated through the use of a weighted virtual measurement along the path of the additional sources of data (e.g. seismic trace).

The virtual sensor mimics a conventional sensor (e.g. production well), and therefore, the present adjoint computation capability of a simulator can be leveraged and extended towards other types of data. In embodiments of the invention, in order to minimize interference of virtual sensing upon the original dynamic behavior of the system under consideration (influence upon flow and fluid contents in the context of flow in porous medium), precautions are taken. Information is assimilated in a spatially and temporally consistent manner.

The original information (e.g. saturation information in the seismic case) is of a given dimension (e.g. curves in 3D space), and respectively the virtual sensors are positioned along the same trajectory, thereby avoiding both displacement and interpolation errors. Also, since the virtual sensors are only activated with accordance to the timing in which the original information was attained, the temporal assimilation is free of interpolation.

Figure 2:
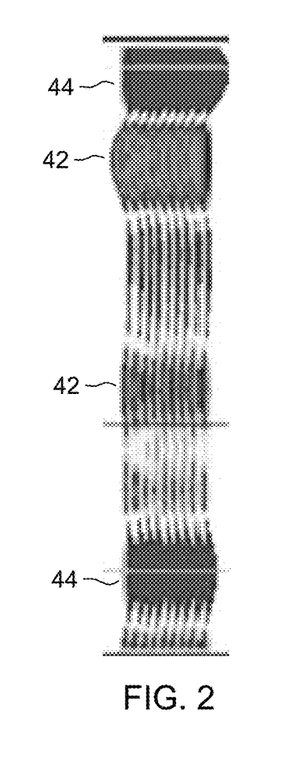
FIG. 2 is an illustration of a reservoir perforated by a collection of virtual wells.
Figure 3:
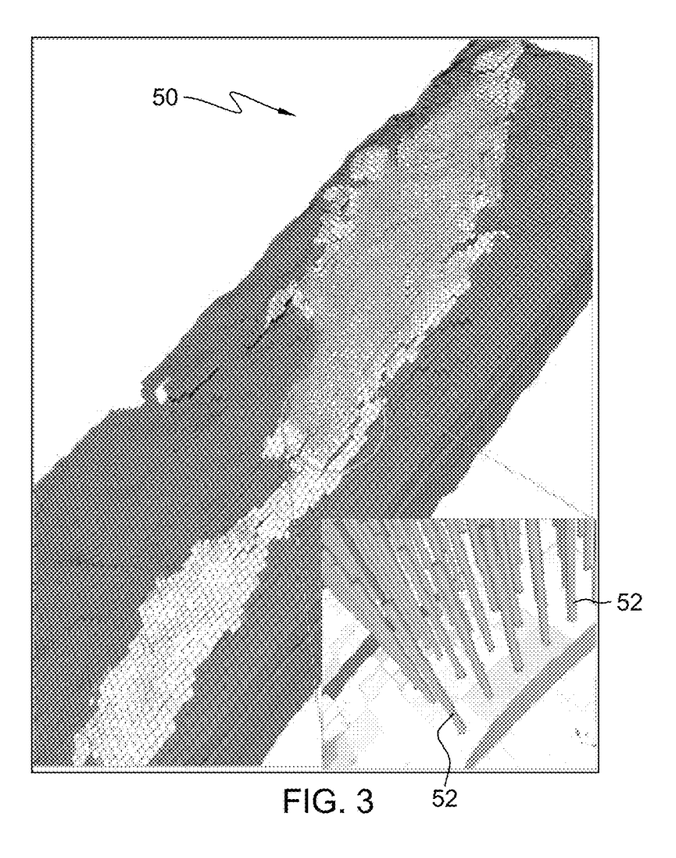
FIG. 3 illustrates a typical interpreted saturation of a seismic trace.

For example, FIG. 2 illustrates a typical interpreted saturation of a seismic trace. Areas 42 correspond to oil saturation, and areas 44 correspond to water, the traces go vertically. Following the curved trajectory of each trace, a specific producer well (virtual sensor) is simulated to mimic the saturation information contained in the trace, as if that information was measured by n actual producer wells. FIG. 3 is an illustration of a reservoir (area 50) perforated by a collection of virtual wells (area 52, depicts tubes probing through the reservoir surface).

The virtual sensors can be deployed in any direction, or trajectory, including horizontal, as long as they are consistent with the information given for the desired source of information (here, seismic attributes in the form of saturation). In many situations, the information is given along curves in 3 dimensional space. In that regard, placing a tubular virtual well along that trajectory is the most consistent way of assimilating such information, avoiding incorporation of unnecessary, and numerically contaminating, interpolation errors.

The virtual wells (area 52) mimic the (interpreted) saturation measurement of a seismic trace through the use of a weighted virtual measurement along the path of the trace. In order to match the ratio of volumetric samples from all grid blocks along the path of the virtual sensor (trace) to the corresponding weight factors, the grid block flow rates correspond to that ratio.

Some simulators do not offer direct prescription of grid block flow rate, in which case, these can still be adjusted indirectly by altering a multiplicative parameter called individual permeability height product multipliers.

Since employment of multiple virtual sensors may be desired, and as the sensors are virtual, one necessary demand, in embodiments of the invention, is that their influence upon the original dynamics would be negligible. In the context of flow in porous medium, precautions to marginalize influence upon flow and fluid contents may be taken.

Once the virtual sensors are configured properly, an adjoint based history matching process (equipped with virtual sensors) can be performed. The respective weight between the contribution of conventional sensors vs. virtual sensors, can be determined by some measure of confidence (covariances, signal to noise ratio, etc.) associated with each source of data.

Figure 4:
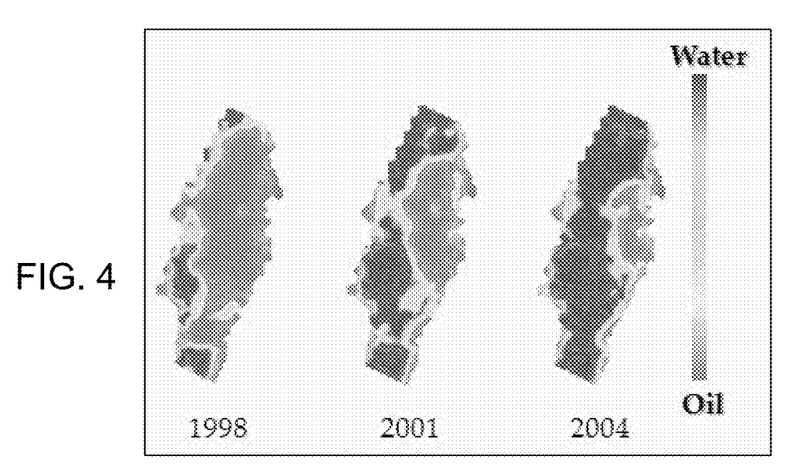
FIG. 4 shows illustrations of recovered saturation in a reservoir using only conventional sensors at three different time instances.

FIG. 4 shows illustrations of recovered saturation in a reservoir using only conventional sensors at three different time instances, 1998, 2001, and 2004.

Figure 5:
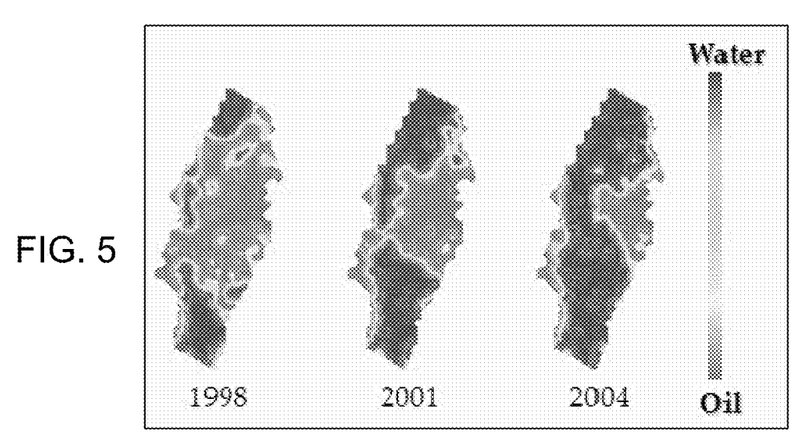
FIG. 5 shows the observed (interpreted) saturation field in the reservoir shown in FIG. 4 using 4D seismic data.

As a comparison, the observed saturation using 4D seismic is presented in FIG. 5.

The two sets display large errors between the saturation recovered using conventional sensors and the observed saturation data obtained through 4D seismic.

Figure 6:
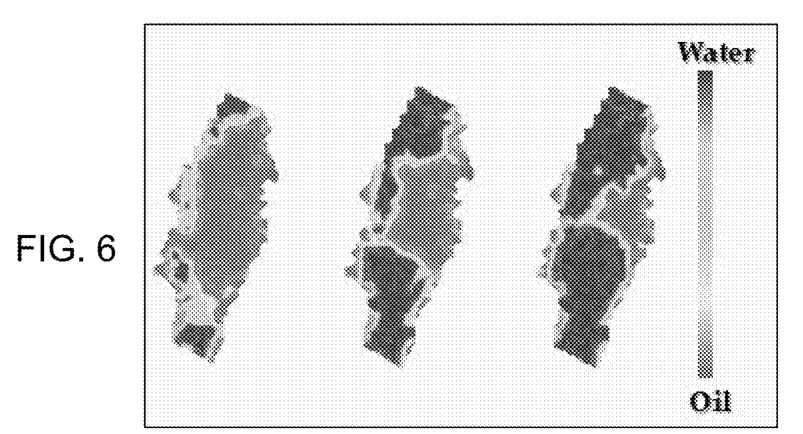
FIG. 6 illustrates saturation maps showing updates of the model parameters using combined production and seismic data, based on sensitivity information from virtual sensors.

Updates of the model parameters using combined production and seismic data, based on the sensitivity information from the virtual sensors, resulted in the saturation maps presented in FIG. 6.

The updated model of FIG. 6 shows a substantial improvement in the saturation data mismatch. Besides the improved model performance, virtual sensing workflow is highly efficient. The principles of virtual sensing are generic, and can be used for consistent and highly efficient incorporation of multiple data sources and types, other than the two demonstrated here (production data with seismic attributes).

Figure 7:
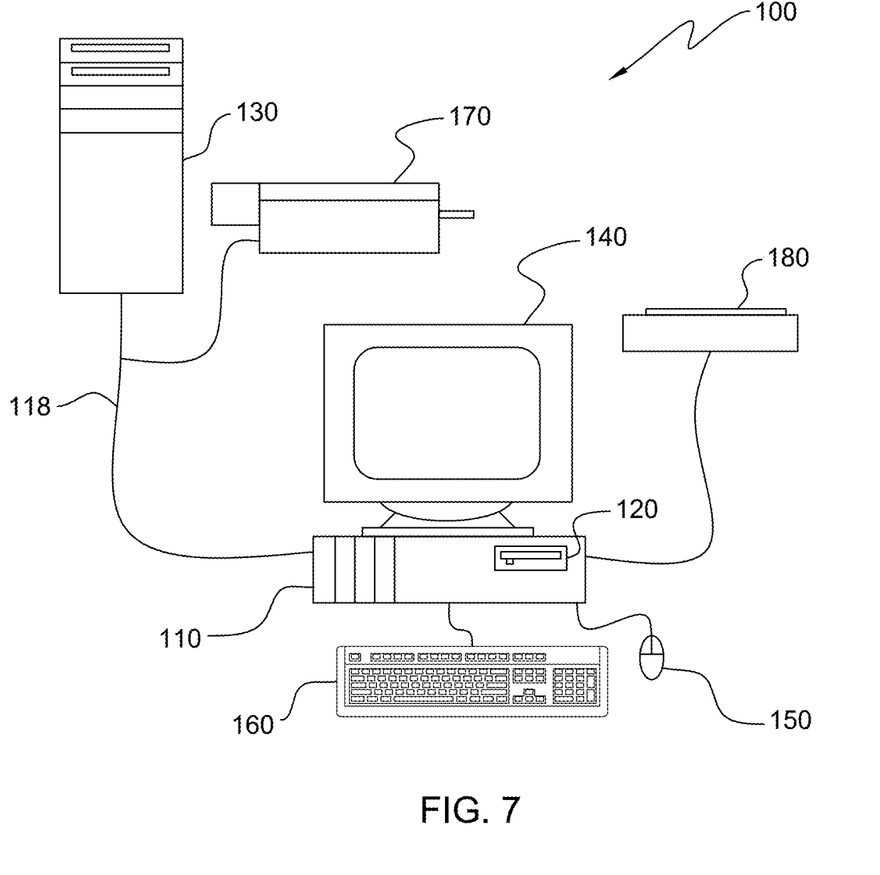
FIG. 7 shows a computing environment that may be used in the practice of this invention.

Referring to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer-based system 100 in which embodiments of the invention may be carried out is depicted in FIG. 7. The computer-based system 100 includes a processing unit 110, which houses a processor, memory and other system components (not shown expressly in the drawing) that implement a general purpose processing system, or a computer that may execute a computer program product. The computer program product may comprise media, for example a compact storage medium such as a compact disc, which may be read by the processing unit 110 through a disc drive 120, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110, as mentioned, or may be located on a remote system such as a server 130, coupled to processing unit 110, via a network interface such as an Ethernet interface. Monitor 140, mouse 150 and keyboard 160 are coupled to the processing unit 110, to provide user interaction. Printer 170 is provided for document input and output. Printer 170 is shown coupled to the processing unit 110 via a network connection, but may be coupled directly to the processing unit. Scanner 180 is shown coupled to the processing unit 110 directly, but it should be understood that peripherals might be network coupled, or direct coupled without affecting the performance of the processing unit 110.

While it is apparent that embodiments of the invention herein disclosed are well calculated to fulfill the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A computer-implemented method of integrating plural sources of information to obtain values for a specified attribute of a given physical system, the method comprising:
    acquiring data of a plurality of modalities from a plurality of sources in the physical system, and converting the data of each of the modalities into attributes of data of a first of the modalities, including
        acquiring data of a first modality from a set of physical sensors in the given physical system,
        acquiring data of a second modality from along a specified trace in the given physical system,
        integrating the data of the first modality and the data of the second modality through the use of a weighted virtual measurement to retain a locality of information of the data of the second modality, including
            configuring a computer system as a simulator with adjoint functionality and with settings of the set of physical sensors,
            configuring a set of virtual sensors by virtually positioning the set of virtual sensors along a path of the specified trace in the physical system,
            using the virtual sensors along the path of the specified trace to mimic measurements of the data of the second modality through the use of weighted virtual measurements obtained using said virtual sensors positioned along the path of the specified trace to retain the locality of information of the data of the second modality, and
            configuring the simulator with adjoint functionality and with settings of the set of virtual sensors to mimic collection of data of the first modality to convert the data of the second modality to data of the first modality; and
    combining, by the computer system, the data of the first modality and the data of the second modality converted to data of the first modality to obtain values for a specified attribute of the given physical system.

2. The method according to claim 1, wherein the data of the second modality comprises saturation measurements of a plurality of seismic traces.

3. The method according to claim 2, wherein the set of virtual sensors mimic the saturation measurements.

4. The method according to claim 3, wherein the seismic traces are along the set of virtual sensors.

5. The method according to claim 1, wherein the system is a reservoir including oil and water, and the set of virtual sensors mimic production wells in the reservoir.

6. The method according to claim 1, wherein the set of virtual sensors enable acquisition of the converted data of the first modality.

7. The method according to claim 1, wherein the combining the data of the first modality and the data of the second modality converted to data of the first modality includes computing sensitivities for the physical sensors and the virtual sensors using the adjoint functionality of the simulator.

8. The method according to claim 1, wherein the configuring a set of virtual sensors in the physical system includes positioning the virtual sensors in the given physical system to maintain spatial consistency with the physical sensors and activating the virtual sensors in accordance with a given timing to maintain temporal consistency with the physical sensors.

9. A computer processing system for integrating plural sources of information to obtain values for one or more specified parameters of a defined physical system, the computer processing system comprising:
one or more processing units configured for:
acquiring a plurality of modalities of data from a plurality of sources in the physical system, and converting each of the modalities of data into attributes of data of a first of the modalities of data, including
acquiring data of a first modality from a set of physical sensors in the given physical system,
acquiring data of a second modality from along a specified trace in the given physical system,
integrating the data of the first modality and the data of the second modality through the use of a weighted virtual measurement to retain a locality of information of the data of the second modality, including
configuring a computer system as a simulator with adjoint functionality and with settings of the plurality of physical sensors,
configuring a set of virtual sensors by virtually positioning the set of virtual sensors along a path of the specified trace in the physical system,
using the virtual sensors along the path of the specified trace to mimic measurements of the data of the second modality through the use of weighted virtual measurements obtained using said virtual sensors positioned along the path of the specified trace to retain the locality of information of the data of the second modality, and
configuring the simulator with adjoint functionality and with settings of the set of virtual sensors to mimic collection of data of the first modality to convert the data of the second modality to data of the first modality; and
combining the data of the first modality and the data of the second modality converted to data of the first modality to obtain values for a specified attribute of the given physical system.

10. The computer processing system according to claim 9, wherein the data of the second modality comprises saturation measurements of a plurality of seismic traces.

11. The computer processing system according to claim 10, wherein the set of virtual sensors mimic the saturation measurements.

12. An article of manufacture comprising:
at least one tangible computer readable hardware device having computer readable program code logic tangibly embodied therein to integrate plural sources of information to obtain values for specified parameters of a given physical system, the computer readable program code logic, when executing on a computer, performing the following:
acquiring a plurality of modalities of data from a plurality of sources in the physical system, and converting each of the modalities of data into attributes of data of a first of the modality of data, including
acquiring data of a first modality from a set of physical sensors in the given physical system,
acquiring data of a second modality from along a specified trace in the given physical system,
integrating the data of the first modality and the data of the second modality through the use of a weighted virtual measurement to retain a locality of information of the data of the second modality, including
configuring a computer system as a simulator with adjoint functionality and with settings of the plurality of physical sensors,
configuring a set of virtual sensors by virtually positioning the set of virtual sensors along a path of the specified trace in the physical system,
using the virtual sensors along the path of the specified trace to mimic measurements of the data of the second modality through the use of weighted virtual measurements obtained using said virtual sensors positioned along the path of the specified trace to retain the locality of information of the data of the second modality, and
configuring the simulator with adjoint functionality and with settings of the set of virtual sensors to mimic collection of data of the first modality to convert the data of the second modality to data of the first modality; and
combining the data of the first modality and the data of the second modality converted to data of the first modality to obtain values for a specified attribute of the given physical system.

13. The article of manufacture according to claim 12, wherein the data of the second modality comprises saturation measurements of a plurality of seismic traces.

14. The article of manufacture according to claim 13, wherein the set of virtual sensors mimic the saturation measurements.

\* \* \* \* \*